(12) United States Patent
Sohn et al.

(10) Patent No.: US 12,036,891 B2
(45) Date of Patent: Jul. 16, 2024

(54) SYSTEM AND METHOD OF CONTROLLING BATTERY CONNECTION FOR ELECTRIC VEHICLE

(71) Applicant: SUNGWOO HITECH CO., LTD., Busan (KR)

(72) Inventors: Sung Man Sohn, Yangsan-si (KR); Tae Hee Kim, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 17/890,381

(22) Filed: Aug. 18, 2022

(65) Prior Publication Data

US 2023/0130454 A1  Apr. 27, 2023

(30) Foreign Application Priority Data

Oct. 26, 2021 (KR) .................... 10-2021-0143513

(51) Int. Cl.
*B60L 58/19* (2019.01)
*B60L 53/22* (2019.01)
*B60L 58/12* (2019.01)
*H02J 7/00* (2006.01)

(52) U.S. Cl.
CPC .............. *B60L 58/19* (2019.02); *B60L 53/22* (2019.02); *B60L 58/12* (2019.02); *H02J 7/0024* (2013.01); *H02J 7/0048* (2020.01); *B60L 2250/16* (2013.01); *B60L 2260/20* (2013.01); *H02J 2207/20* (2020.01)

(58) Field of Classification Search
CPC .......... B60L 58/19; B60L 58/12; H02J 7/0024
USPC .......................................... 307/10.1; 320/117
See application file for complete search history.

(56) References Cited

U.S. PATENT DOCUMENTS

| | | | | |
|---|---|---|---|---|
| 8,655,535 B2* | 2/2014 | Oh | ...................... | B60L 15/2045 |
| | | | | 701/22 |
| 11,005,277 B2* | 5/2021 | Oukassi | .................. | H02M 3/18 |
| 2022/0402395 A1* | 12/2022 | Prasad | .................... | B60L 53/60 |

FOREIGN PATENT DOCUMENTS

KR  10-2012-0081824  7/2012
KR  10-2019-0027450  3/2019

* cited by examiner

*Primary Examiner* — Daniel Kessie
*Assistant Examiner* — Dru M Parries
(74) *Attorney, Agent, or Firm* — LEX IP MEISTER, PLLC (57) ABSTRACT

Disclosed is a system and a method of controlling a battery connection of an electric vehicle. The system for controlling a battery connection of an electric vehicle, the system including: a battery unit including a plurality of battery packs; a power relay assembly (PRA) for electrically connecting or disconnecting the battery unit and an inverter, and changing a connection structure of the plurality of battery packs to one of a battery unit serial mode and a battery unit parallel mode through a plurality of relays; and a controller for switching the connection structure to the battery unit serial mode through the PRA in response to a driver's request to increase motor output, and switches the connection structure to the battery unit parallel mode through the PRA in response to a driver's request to increase a cruising distance.

10 Claims, 6 Drawing Sheets

SYSTEM AND METHOD OF CONTROLLING BATTERY CONNECTION FOR ELECTRIC VEHICLE

CROSS-REFERENCE TO RELATED APPLICATION

This application claims priority to and the benefit of Korean Patent Application No. 10-2021-0143513 filed in the Korean Intellectual Property Office on Oct. 26, 2021, the entire contents of which are incorporated herein by reference.

BACKGROUND OF THE INVENTION

(a) Field of the Invention

The present invention relates to a system and a method of controlling a battery connection of an electric vehicle, and more particularly, to a system and a method of controlling a battery connection of an electric vehicle, which are capable of varying a connection structure of a battery pack according to a driver's needs.

(b) Description of the Related Art

An electric vehicle (EV) means a vehicle driven by the power of a motor using electric energy, and a high-voltage battery pack for storing the electric energy is provided.

Unlike general internal combustion engine vehicles, electric vehicles obtain driving force through a motor, so the charging capacity of the battery is increased to increase the cruising distance or to improve output performance.

However, battery packs of electric vehicles that are currently mass-produced have a fixed cruising distance with a fixed connection method. For example, depending on the model of the electric vehicle, the battery is composed of a basic type (for example, 58 kWh) and a long range type (for example, 73 kWh) and each type has a cruising distance of a specified standard, therefore, there is a problem in that it is impossible to extend the output and cruising distance of the electric vehicle according to the needs of the user.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a system and a method of controlling a battery connection of an electric vehicle, which are capable of increasing output performance of a battery of an electric vehicle or increasing a cruising distance of an electric vehicle by changing a connection structure of a plurality of battery packs mounted in the electric vehicle in series or in parallel according to a driver's demand.

An exemplary embodiment of the present invention provides a system for controlling a battery connection of an electric vehicle, the system including: a battery unit including a plurality of battery packs; a power relay assembly (PRA) for electrically connecting or disconnecting the battery unit and an inverter, and changing a connection structure of the plurality of battery packs to one of a battery unit serial mode and a battery unit parallel mode through a plurality of relays; and a controller for switching the connection structure to the battery unit serial mode through the PRA in response to a driver's request to increase motor output, and switching the connection structure to the battery unit parallel mode through the PRA in response to a driver's request to increase a cruising distance.

Each of the plurality of battery packs may be an independent structure, and may be configured to have the same voltage and capacity as each other.

The PRA may include a connection mode switching-type circuit including: a series relay for connecting the plurality of battery packs in series or disconnecting the plurality of battery packs; a parallel relay for connecting the plurality of battery packs in parallel or disconnecting the plurality of battery packs; and an output relay for finally outputting a voltage applied from the series relay or the parallel relay.

The PRA may further include a circuit breaker for connecting the connection mode switching type circuit to the main relay circuit for connection with the inverter or disconnecting the connection mode switching type circuit.

The PRA may increase output performance of the motor by increasing a voltage through the battery unit serial mode for connecting the plurality of battery packs in series according to a control signal applied from the controller.

The PRA may increase the cruising distance of the motor by increasing a capacity through the battery unit parallel mode for connecting the plurality of battery packs in parallel according to a control signal applied from the controller.

The system may further include a changeover switch for inputting a request signal for requesting to switch of the connection structure to any one of the battery unit serial mode and the battery unit parallel mode according to an operation of a driver.

The changeover switch may be formed of a hardware operation system installed in a center fascia area or a software button displayed on a vehicle navigation system.

When the changeover switch is input according to a driver's request for increasing motor output, the controller may selectively control any one of a battery unit serial mode and the battery unit parallel mode through the PRA.

The controller may selectively control into any one of the battery unit serial mode and the battery unit parallel mode through the PRA in conjunction with a vehicle driving mode on which a driving intention of the driver is reflected.

When the vehicle driving mode is a sport mode, the controller may operate in the battery unit serial mode, and when the vehicle driving mode is an eco mode, the controller operates in the battery unit parallel mode.

The controller may collect a state of charge (SOC) of the battery unit, and when the current SOC is equal to or less than a threshold value, the controller may restrict the switching to the battery unit serial mode through the PRA.

Another exemplary embodiment of the present invention provides a method of controlling a battery connection of an electric vehicle provided with a power relay assembly (PRA) which is capable of connecting a battery unit including a plurality of battery packs in a series or a parallel through a plurality of relays, the method including: a) inputting a changeover switch according to a driver's request to increase motor output during an operation of the electric vehicle; b) controlling a battery unit in a battery unit serial mode by applying a control signal to the PRA; c) inputting the changeover switch according to a driver's request to increase a cruising distance during the control of the battery unit in the battery unit serial mode; and d) applying a control signal to the PRA to switch the battery unit serial mode to the battery unit parallel mode.

The controlling of the battery unit in the battery unit serial mode may include connecting a (+) terminal of a first battery pack and a (−) terminal of a second battery pack in series by switching on a series relay of the PRA, and switching off a parallel relay.

The controlling of the battery unit in the battery unit serial mode may further include: outputting a voltage of the (+) terminal of the second battery pack, which is an upper voltage of the battery unit, to a main relay by switching off an output relay of the PRA; charging a capacitor of an inverter with a current lowered through a precharge resistor by switching on a precharge relay of the PRA; finally outputting the voltage of the (+) terminal of the second battery pack to an inverter (+) terminal by switching on a main relay (+) terminal of the PRA; and finally outputting the voltage of a (−) terminal of the first battery pack to an inverter (−) terminal by switching on a main relay (−) terminal of the PRA.

The switching of the battery unit serial mode to the battery unit parallel mode may include connecting the (−) terminal of the first battery pack and the (−) terminal of the second battery pack in parallel by switching on the parallel relay of the PRA, and switching off the series relay.

The switching of the battery unit serial mode to the battery unit parallel mode may include: connecting the (+) terminal of the first battery pack and the (+) terminal of the second battery pack in parallel by switching on the output relay of the PRA; charging the capacitor of the inverter with a current lowered through a precharge resistor by switching on the precharge relay of the PRA; finally outputting the voltage of the (+) terminal of the first battery pack to the inverter (+) terminal by switching on the main relay (+) terminal of the PRA; and finally outputting the voltage of the (−) terminal of the first battery pack to the inverter (−) terminal by switching on the main relay (−) terminal of the PRA.

The method may further include: between the step a) and the step b), determining whether a current SOC of the battery unit is equal to or less than a set threshold value; and when the SOC is equal to or less than the set threshold value, restricting the switching to the battery unit serial mode.

The method may further include: after the step b), determining whether the current SOC of the battery collected during operation in the battery unit serial mode is equal to or less than a set threshold value; and forcibly switching the battery unit serial mode to the battery unit parallel mode.

According to the exemplary embodiment of the present invention, there is an effect in increasing output performance of a battery or increasing a cruising distance according to a driver's request by configuring the PRA capable of changing a connection structure of a plurality of battery packs mounted to an electric vehicle to a serial structure and a parallel structure.

Further, the battery serial mode is supported to the maximum according to the driver's request for output performance improvement, but when the SOC of the battery is insufficient, the change to the battery serial mode is restricted, and when the SOC is insufficient during the operation in the serial mode, the serial mode is automatically switched to the parallel mode, thereby achieving an effect in stably managing the battery.

DETAILED DESCRIPTION OF THE EXEMPLARY EMBODIMENTS

In the following detailed description, only certain exemplary embodiments of the present invention have been illustrated and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, in describing the constructional elements of the present invention, the terms of a first, a second, A, B, (a), (b), or the like, can be used, but the constituent elements shall not be limited by the terms. Such a term is only for discriminating the constructional element from another constructional element, and does not limit the essential feature.

Throughout the specification, it should be understood that when one constituent element is referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

The term used in the present specification is simply used for describing a specific embodiment and does not intend to limit the present invention. A singular expression includes a plural expression unless it is specifically described to the contrary in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those skilled in the art unless they are differently defined in the present specification. Terms defined in generally used dictionary shall be construed that they have meanings matching those in the context of a related art, and shall not be construed in ideal or excessively formal meanings unless they are clearly defined in the present application.

Now, a system for controlling a battery connection of an electric vehicle according to an exemplary embodiment of the present invention will be described in detail with reference to the drawings.

Figure 1:
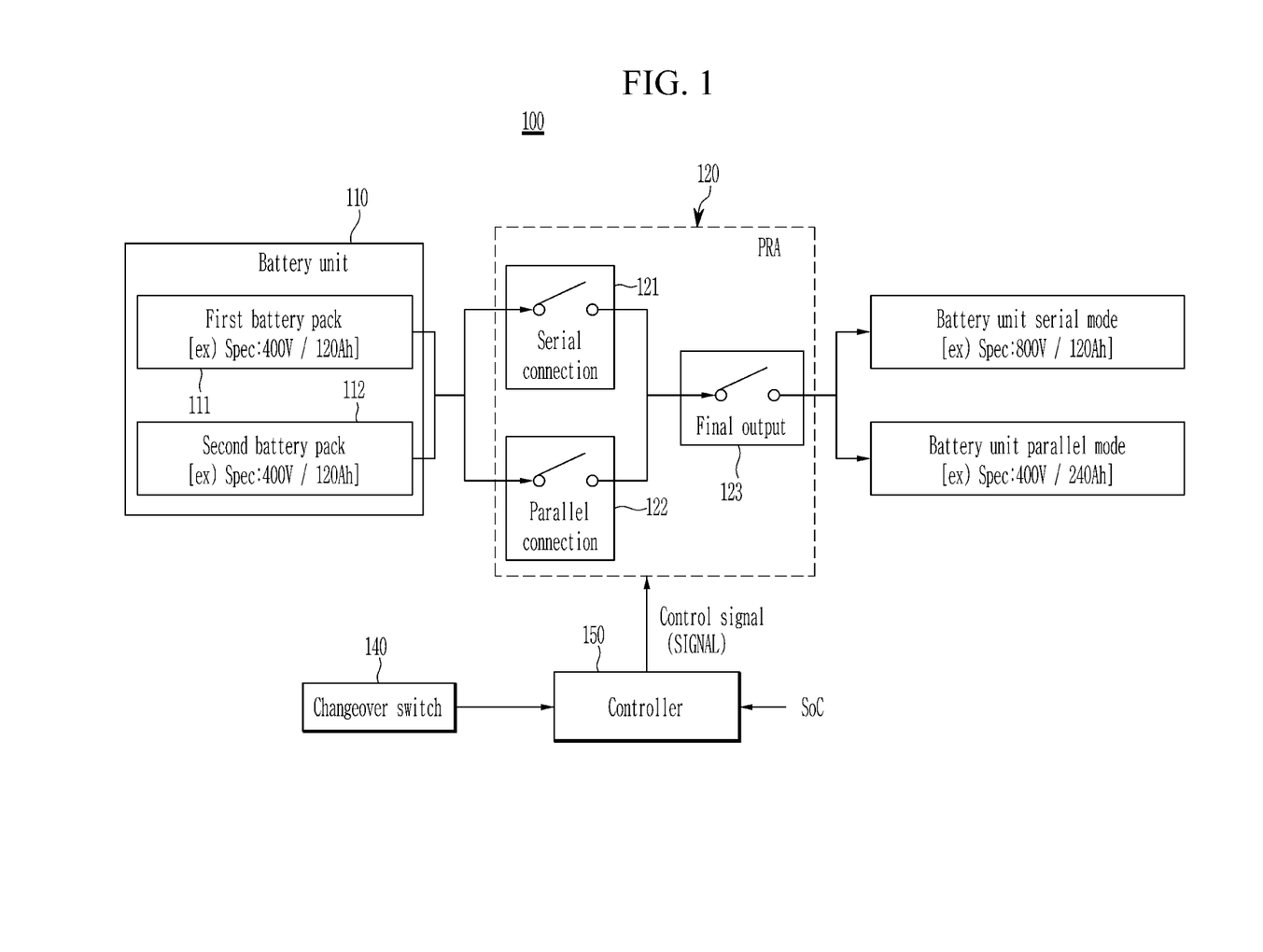
FIG. 1 is a block diagram schematically illustrating a configuration of a system for controlling a battery connection of an electric vehicle according to an exemplary embodiment of the present invention.
Figure 2:
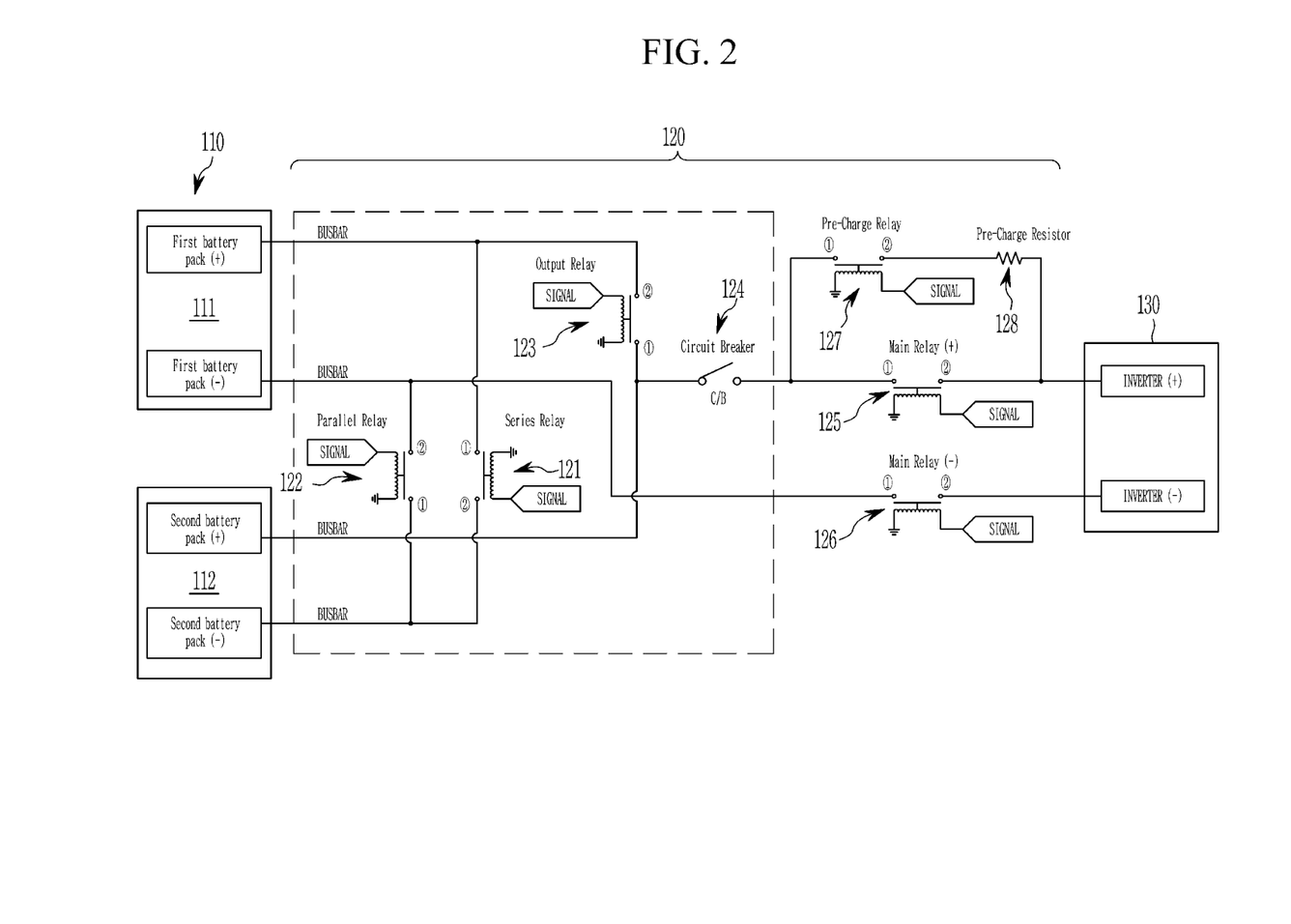
FIG. 2 is a diagram illustrating a connection structure of a battery unit according to an exemplary embodiment of the present invention.

FIG. 1 is a block diagram schematically illustrating a configuration of a system for controlling a battery connection of an electric vehicle according to an exemplary embodiment of the present invention, and FIG. 2 is a diagram illustrating a connection structure of a battery unit according to an exemplary embodiment of the present invention.

Referring to FIGS. 1 and 2, a system 100 for controlling a battery connection of an electric vehicle according to an exemplary embodiment of the present invention includes a battery unit 110 including a plurality of battery packs, a power relay assembly (PRA) 120 that electrically connects or disconnects the battery unit 110 and an inverter 130 to change a connection structure of the plurality of battery pack to a serial structure and a parallel structure through a plurality of relays, and a controller 150 capable of switching the PRA 120 in series in response to a driver's (user's) request to increase motor output and switching the PRA 120 in parallel in response to a driver's request to increase a cruising distance.

The battery unit 110 includes a first battery pack 111 and a second battery pack 112 configured independently of each other. Hereinafter, the battery unit 110 will be described assuming that the battery unit 110 includes two battery packs 111 and 112 for convenience of description, but the number of the battery packs 111 and 112 is not limited to two and may be further increased.

The RPA 120 may further include a connection mode switching-type circuit including a series relay 121 for connecting in series or disconnecting the plurality of battery packs 111 and 112 configured in the battery unit 110, a parallel relay 122 for connecting in parallel or blocking the plurality of battery packs 111 and 112, and an output relay 123 that finally outputs a voltage applied from the series relay 121 or the parallel relay 122. Herein, the RPA 120 may further include a circuit breaker 124 for connecting or disconnecting the connection mode switching type circuit to a main relay of the general PRA 120 circuit.

Further, the general PRA 120 may include a main relay (+) 125 connected to an inverter (+) terminal, a main relay (−) 126 connected to an inverter (−) terminal, a pre-charge relay 127 for initially charging the inverter 130 to prevent damage caused by high voltage inrush current before the relay is driven, and a pre-charge resistor 128.

The inverter 130 converts direct current (DC) power supplied from the battery unit 110 into a three-phase alternating current (AC) voltage to generate a driving torque of a motor (not illustrated).

The first battery pack 111 and the second battery pack 112 of the battery unit 110 are each an independent structure, and are configured to have the voltage and the capacity of the same specification by packaging the battery modules in which a plurality of cells are stacked in the required number.

For example, the specification of each of the battery packs 111 and 112 of the battery unit 110 may have a voltage of 400V and a capacity of 120 Ah.

The PRA 120 may increase an output of the motor by increasing a voltage by connecting the first battery pack 111 and the second battery pack 112 in series (hereinafter, referred to as the "battery unit serial mode") according to a control signal applied from the controller 150 (for example, a serial mode specification of the battery unit: 800 V/120 Ah).

Further, the PRA 120 may increase a cruising distance of the motor by increasing a capacity by connecting the first battery pack 111 and the second battery pack 112 in parallel (hereinafter, referred to as the "battery unit parallel mode") according to a control signal applied from the controller 150 (for example, a parallel mode specification of the battery unit: 400 V/240 Ah).

On the other hand, the system 100 for controlling the battery connection of the electric vehicle further includes a changeover switch 140 for inputting a request signal for requesting to switch to any one of the serial mode and the parallel mode according to the driver's operation. The changeover switch 140 may be configured as a hardware operation system configured in the center fascia area or a software button displayed on a vehicle navigation system.

The controller 150 controls the overall operation of the system 100 for controlling the battery connection of the electric vehicle according to the exemplary embodiment of the present invention, and includes at least one program and data to this end.

The controller 150 may selectively implement any one of the battery unit serial mode and the battery unit parallel mode by controlling the PRA 120 according to the driver's request signal received from the changeover switch 140. At this time, if any one mode is being operated during the travelling of the electric vehicle, the controller 150 may switch the one mode to another mode according to the input of the changeover switch 140.

In addition, the controller 150 may selectively implement any one of the battery unit serial mode and the battery unit parallel mode in conjunction with a vehicle driving mode in which the driving intention of the driver is reflected. For example, when the vehicle is operating in the sport mode (that is, power mode), the PRA 120 is controlled in the battery unit serial mode, and when the vehicle is operating in the eco mode (that is, fuel economy mode), the PRA 120 may be controlled in the battery unit parallel mode.

In addition, the controller 150 may collect a state of charge (SOC) from a battery management system (BMS) or a sensor of the BMS, and when the current SOC is equal to or less than a threshold value, the controller 150 may restrict the PRA 120 from entering the battery unit serial mode.

The controller 150 may be implemented as one or more processors operating according to a set program, and the set program may be programmed to perform each operation of a method for controlling a battery connection of an electric vehicle according to an exemplary embodiment of the present invention.

A method for controlling a battery connection of an electric vehicle will be described in more detail with reference to the drawings below.

Figure 3:
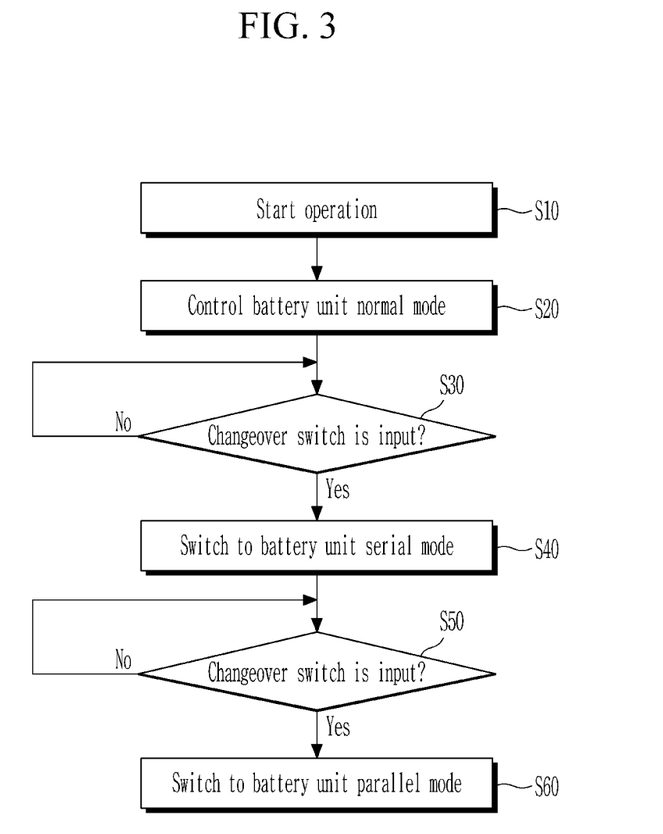
FIG. 3 is a flowchart illustrating a method of controlling a battery connection of an electric vehicle according to an exemplary embodiment of the present invention.

FIG. 3 is a flowchart illustrating a method of controlling a battery connection of an electric vehicle according to an exemplary embodiment of the present invention.

Referring to FIG. 3, the controller 150 of the system 100 for controlling the battery connection according to the exemplary embodiment of the present invention turns on a power supply of an electric vehicle and then starts an operation (S10), and operates in a battery unit parallel mode through the PRA 120 (S20). In this case, the controller 150 may be set as a default to operate in the battery parallel mode when the vehicle starts operating, or may call the mode last stored in the previous operation.

When the changeover switch 140 is not input during the operation in the battery unit parallel mode (NO in S30), the controller 150 maintains the current mode.

On the other hand, when the changeover switch 140 according to the driver's request is input during the operation in the battery unit parallel mode (YES in S30), the controller 150 switches the battery unit parallel mode to the battery unit serial mode through the PRA 120 (S40).

Figure 4:
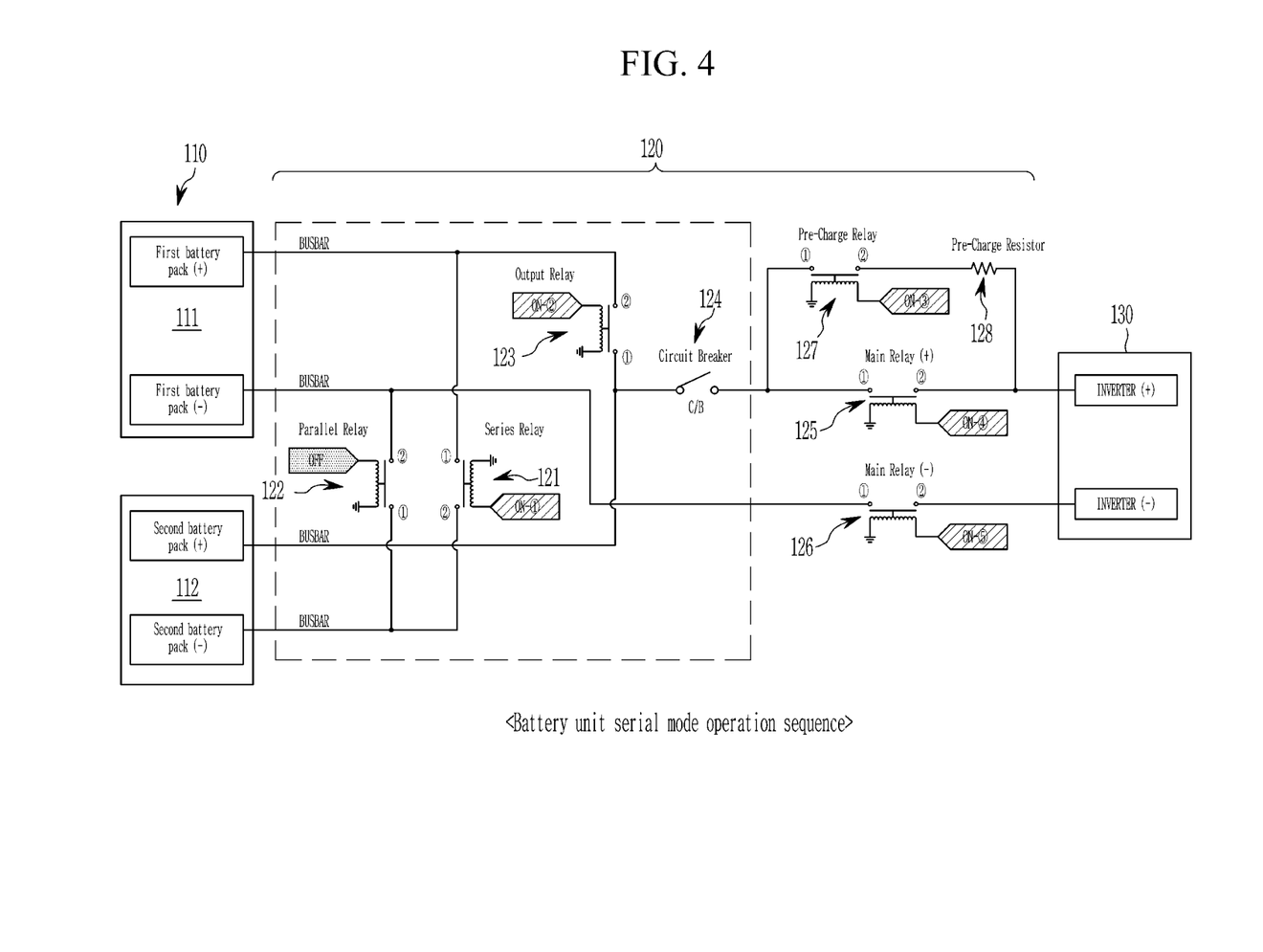
FIG. 4 is a diagram illustrating an operation sequence in a battery unit serial mode according to the exemplary embodiment of the present invention.

For example, FIG. 4 is a diagram illustrating an operation sequence in the battery unit serial mode according to the exemplary embodiment of the present invention.

Referring to FIG. 4, the method of operating, by the controller 150, the PRA 120 in the battery unit serial mode includes: ① connecting the (+) terminal of the first battery pack 111 and the (−) terminal of the second battery pack 112 in series by switching on the series relay 121, and switching off the parallel relay 122; ② outputting a voltage of the (+) terminal of the second battery pack 111, which is the upper voltage of the battery unit to the main relay by switching off the output relay 123; ③ charging a capacitor of the inverter 130 with the current lowered through the precharge resistor 128 by switching on the precharge relay 127; ④ finally outputting the voltage of the (+) terminal of the second battery pack 111 to the inverter (+) terminal by switching on the main relay (+) 125; and ⑤ finally outputting the voltage of the (−) terminal of the first battery pack 111 to the inverter (−) terminal by switching on the main relay (−) 126.

As such, the controller 150 may increase the voltage supplied to the inverter 130 by selectively controlling the battery unit 110 in the serial mode according to the driver's request, thereby increasing the output performance of the motor.

On the other hand, when the changeover switch 140 is not input during the operation in the battery unit serial mode (NO in S50), the controller 150 maintains the current mode.

On the other hand, when the changeover switch 140 according to the driver's request is input during the operation in the battery unit serial mode (YES in S50), the controller 150 switches the battery unit serial mode to the battery unit parallel mode through the PRA 120 (S60).

Figure 5:
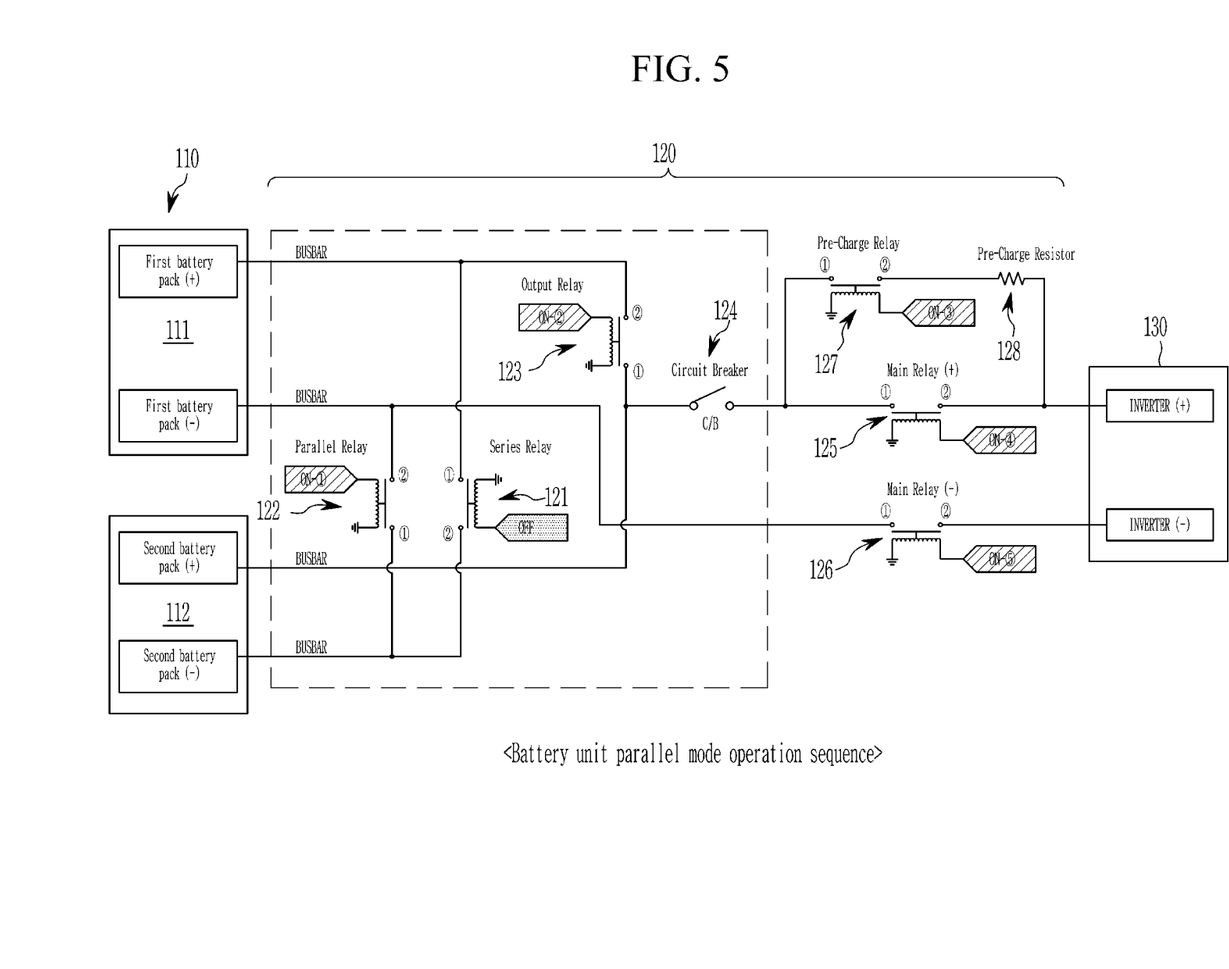
FIG. 5 is a diagram illustrating an operation sequence in a battery unit parallel mode according to the exemplary embodiment of the present invention.

For example, FIG. 5 is a diagram illustrating an operation sequence in the battery unit parallel mode according to the exemplary embodiment of the present invention.

Referring to FIG. 5, the method of operating, by the controller 150, the PRA 120 in the battery unit parallel mode includes: ① connecting the (−) terminal of the first battery pack 111 and the (−) terminal of the second battery pack 112 in parallel by switching on the parallel relay 122, and switching off the series relay 121; ② connecting the (+) terminal of the first battery pack 111 and the (+) terminal of the second battery pack 112 in parallel by switching on the output relay 123; ③ charging the capacitor of the inverter 130 with the current lowered through the precharge resistor 128 by switching on the precharge relay 127; ④ finally outputting the voltage of the (+) terminal of the first battery pack 111 to the inverter (+) terminal by switching on the main relay (+) (125); and ⑤ finally outputting the voltage of the (−) terminal of the first battery pack 112 to the inverter (−) terminal by switching on the main relay (−) 126.

As described above, the controller 150 may selectively control the battery unit 110 in the parallel mode according to the driver's request, thereby increasing the cruising distance according to an increase in the capacity of the battery unit 110.

Thereafter, the switching between the battery unit serial mode and the battery unit parallel mode may be repeated according to the driver's request, and is ended when the electric vehicle is powered off.

In the foregoing, the exemplary embodiment of the present invention has been described, but the present invention is not limited only to the exemplary embodiment, and other various modifications are possible.

Figure 6:
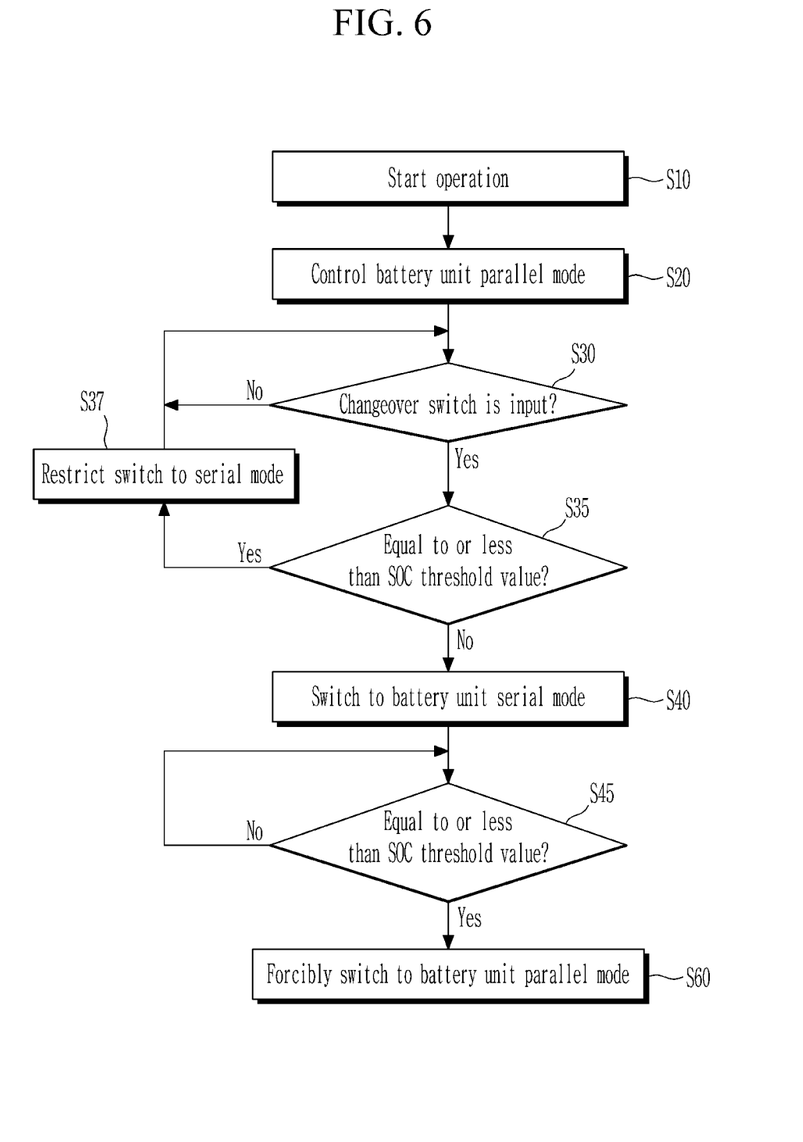
FIG. 6 is a flowchart illustrating a method of controlling a battery connection of an electric vehicle according to an additional exemplary embodiment of the present invention.

For example, FIG. 6 is a flowchart illustrating a method of controlling a battery connection of an electric vehicle according to an additional exemplary embodiment of the present invention.

The additional exemplary embodiment of the invention illustrated in FIG. 6 is similar to the exemplary embodiment in FIG. 3. However, according to the additional exemplary embodiment of the present invention illustrated in FIG. 6, the entry/switching of the battery unit serial mode and the battery unit parallel mode is controlled by further considering the SOC of the battery. Accordingly, descriptions overlapping with the descriptions of the exemplary embodiments of the present invention will be omitted, and differences will be mainly described.

Referring to FIG. 6, the controller 150 may recognize an SOC of a battery from the BMS in real time while the electric vehicle is being operated.

When the changeover switch 140 according to the driver's request is input while the electric vehicle is operating in the battery unit parallel mode (YES in S30), the controller 150 determines whether the current battery SOC is equal to or less than a set threshold value (S35).

At this time, when the current battery SOC is equal to or less than the set threshold value (YES in S35), the controller 150 may restrict the switching to the battery unit serial mode even though there is a driver's request (S37) and notify the driver of the reason for the restriction of the mode conversion (for example, low battery SOC).

On the other hand, if the current battery SOC is not equal to or less than the set threshold value (NO in S35), the controller 150 switches the battery unit parallel mode to the battery unit serial mode (S40).

Thereafter, if the current battery SOC collected during the operation in the battery unit serial mode is not equal to or less than the set threshold value (NO in S45), the controller 150 maintains the battery unit serial mode.

On the other hand, when the current battery SOC collected during the operation in the battery unit serial mode is equal to or less than the set threshold value (YES in S45), the controller 150 may forcibly switch the battery unit serial mode to the battery unit parallel mode (S60) and notify the driver of the reason for the forcible switch (for example, low battery SOC).

As described above, according to the exemplary embodiment of the present invention, it is possible to increase the battery output performance or the cruising distance according to the driver's request through the power relay assembly (PRA) capable of changing the connection structure of a plurality of battery packs mounted in the electric vehicle in series and parallel.

In addition, the battery serial mode is supported as much as possible according to the driver's request for output performance improvement, but when the SOC of the battery is insufficient, the change to the serial mode of the battery is restricted, and in case of insufficient SOC while the operation in the serial mode, the serial mode is forcibly switched to the parallel mode, which has the effect of stably managing the battery.

The exemplary embodiment of the present invention is not implement only through the device and/or method described above, and may be implemented through a program for implementing a function corresponding to the configuration of the exemplary embodiment of the present invention, a recording medium in which the program is recorded, and the like, and the implementation may be easily realized by those skilled in the art based on the description of the exemplary embodiment.

Although an exemplary embodiment of the present invention has been described in detail, the scope of the present invention is not limited by the exemplary embodiment. Various changes and modifications using the basic concept of the present invention defined in the accompanying claims by those skilled in the art shall be construed to belong to the scope of the present invention.

What is claimed is:

1. A system for controlling a battery connection of an electric vehicle, the system comprising:
   a battery unit including first and second battery packs, each being provided with a (+) terminal and a (−) terminal;
   a power relay assembly (PRA) for electrically connecting or disconnecting the battery unit and an inverter, and changing a connection structure of the plurality of battery packs to one of a battery unit serial mode and a battery unit parallel mode through a plurality of relays; and
   a controller for switching the connection structure to the battery unit serial mode through the PRA in response to a driver's request to increase motor output, and switching the connection structure to the battery unit parallel mode through the PRA in response to a driver's request to increase a cruising distance,
   wherein:
   the PRA includes:
   a series relay configured to selectively connect the (+) terminal of the first battery pack with the (−) terminal of the second battery pack;
   a parallel relay configured to selectively connect the (−) terminal of the first battery pack with the (−) terminal of the second battery pack;
   an output relay configured to switching between outputting a voltage of the (+) terminal of the first battery pack and connecting the (+) terminal of the first battery pack with the (+) terminal of the second battery pack in parallel;
   a main relay (+) terminal configured to be connected to an output terminal of the output relay and selectively connected to an inverter (+) terminal;
   a main relay (−) terminal configured to be connected to the (−) terminal of the first battery pack and selectively connected to an inverter (−) terminal;
   a precharge relay provided on a precharge line connecting a line between the output terminal of the output relay and the inverter (+) terminal with the main relay (+) terminal in parallel, and selectively connect or disconnect the precharge line; and
   a precharge resistor provided on the precharge line and causing a current lower than a current supplied to the inverter (+) terminal through the main relay (+) terminal to flow through the precharge line.

2. The system of claim 1, wherein:
each of the first and second battery packs is an independent structure, and is configured to have the same voltage and capacity as each other.

3. The system of claim 1, wherein:
the PRA further includes a circuit breaker for connecting or disconnecting the output terminal of the output relay and the main relay (+) terminal.

4. The system of claim 1, wherein:
the PRA increases output performance of the motor by increasing a voltage through the battery unit serial mode for connecting the first and second battery packs in series according to a control signal applied from the controller.

5. The system of claim 1, wherein:
the PRA increases the cruising distance of the motor by increasing a capacity through the battery unit parallel mode for connecting the first and second battery packs in parallel according to a control signal applied from the controller.

6. The system of claim 1, further comprising:
a changeover switch for inputting a request signal for requesting to switch of the connection structure to any one of the battery unit serial mode and the battery unit parallel mode according to an operation of a driver.

7. The system of claim 6, wherein:
the changeover switch is formed of a hardware operation system installed in a center fascia area or a software button displayed on a vehicle navigation system.

8. The system of claim 6, wherein:
when the changeover switch is input according to a driver's request for increasing motor output, the controller selectively controls in any one of a battery unit serial mode and the battery unit parallel mode through the PRA.

9. The system of claim 1, wherein:
the controller selectively controls into any one of the battery unit serial mode and the battery unit parallel mode through the PRA in conjunction with a vehicle driving mode on which a driving intention of the driver is reflected.

10. The system of claim 9, wherein:
when the vehicle driving mode is a sport mode, the controller operates in the battery unit serial mode, and when the vehicle driving mode is an eco mode, the controller operates in the battery unit parallel mode.

* * * * *